United States Patent [19]
Frei et al.

[11] Patent Number: 4,659,023
[45] Date of Patent: Apr. 21, 1987

[54] PROCESS AND AN APPARATUS FOR THE PROPORTIONING OF COFFEE POWDER IN A COFFEE MACHINE

[75] Inventors: Hans-Peter Frei, Oetwil am See; Arthur Schmed, Oberdürnten, both of Switzerland

[73] Assignee: Gesamat AG, Ballwil, Switzerland

[21] Appl. No.: 643,735

[22] Filed: Aug. 24, 1984

[30] Foreign Application Priority Data

Aug. 25, 1983 [CH] Switzerland .................. 4649/83

[51] Int. Cl.⁴ ............................................. B02C 25/00
[52] U.S. Cl. ...................................... 241/30; 241/36; 241/100
[58] Field of Search .................... 241/101.1, 36, 34, 33, 241/248, 258, 257 R, 30, 261.2, 261.3, 100; 99/286, 289 R

[56] References Cited
U.S. PATENT DOCUMENTS

| | | | |
|---|---|---|---|
| 405,019 | 6/1889 | Drude | 241/36 |
| 3,386,666 | 6/1968 | Dore | 241/33 |
| 4,007,675 | 2/1977 | Cailliot et al. | 241/36 X |
| 4,188,863 | 2/1980 | Grossi | 99/286 |

FOREIGN PATENT DOCUMENTS 2847220 5/1979 Fed. Rep. of Germany .
613031 11/1960 Italy ....................... 241/36

*Primary Examiner*—Mark Rosenbaum
*Attorney, Agent, or Firm*—Tarolli, Sundheim & Covell

[57] ABSTRACT

A coffee machine includes a grinding mill, a proportioning chamber arranged adjacent to the outlet of the grinding mill and a processing chamber, into which the coffee powder from the proportioning chamber is discharged. The coffee powder coming from the grinding mill is thrown into the proportioning chamber, which includes a pressure sensitive, elastically resilient wall element with a signal generator connected thereto. As soon as the proportioning chamber is filled with coffee powder, a dynamic pressure is built-up within the proportioning chamber due to the overpressure caused by the grinding mill, which forces the wall element to a displacement, whereby the signal generator is operated. Subsequently, on the one hand, the motor of the grinding mill is switched off and, on the other hand, a bottom wall part of the proportioning chamber is unlocked, whereby the milled product, assisted by the elastically resilient wall element, is discharged from the proportioning chamber.

3 Claims, 1 Drawing Figure

U.S. Patent   Apr. 21, 1987   4,659,023
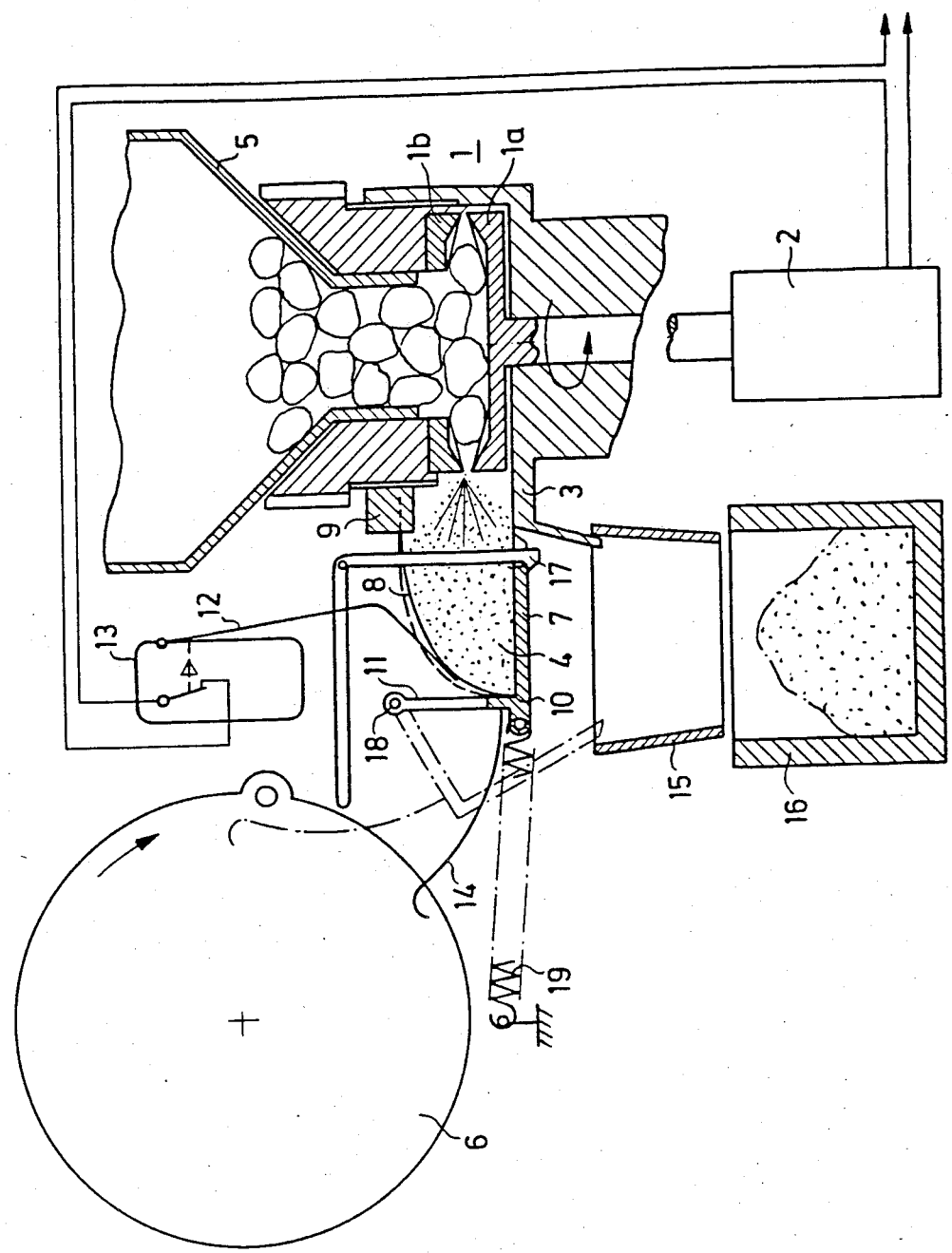

PROCESS AND AN APPARATUS FOR THE PROPORTIONING OF COFFEE POWDER IN A COFFEE MACHINE

BACKGROUND OF THE INVENTION

1. Field of the Invention

The present invention refers to the field of preparing coffee by means of a coffee machine which is supplied with water and coffee beans. More specifically, the invention refers to a process for the proportioning of coffee powder in a coffee machine as well as to an apparatus for performing said process including a coffee machine equipped with a grinding mill adapted to prepare the required coffee powder from the coffee beans and with a processing chamber receiving the proportioned coffee powder to be brewed in order to furnish the desired coffee.

2. Prior Art

Known coffee machines of this kind contain a grinding mill driven to a constant speed by means of an electric motor. At the outlet aperture of the grinding mill, the milled coffee prepared by the grinding mill falls into a processing chamber, where it is subsequently brewed by means of hot water or steam. The proportioning of the amount of coffee powder, which is to be filled into the processing chamber, is performed in the known coffee machines by a time control means, inasmuch as the duration of the operation of the grinding mill driving motor is controlled. Under the already mentioned assumption that the motor is driven to a constant speed, the amount of coffee powder falling into the processing chamber may thereby be proportioned by means of a variation of the operating time of the motor.

In the case of bigger coffee machines, as being used, e.g. in restaurants, such equipment works substantially satisfactorily. The most important factor inhibiting a transformation of this concept to household coffee machines is the expensive motor for the grinding mill, which is usually an induction motor.

In the past, one has tried to solve this problem by providing a proportioning chamber adjoining the outlet of the grinding mill. As soon as said proportioning chamber is filled with coffee powder provided by the mill, the chamber is opened and its content is supplied to the processing chamber of the coffee machine. An apparatus of this kind is disclosed e.g. in the German Patent Publication No. 28 47 220. Thereby the coffee powder is thrown into the proportioning chamber, which is in a closed position, by means of an arrangement including a plurality of bars, levers and springs. As soon as the chamber is filled with coffee powder, the pressure of the powder should act on the walls of the proportioning chamber. One wall portion thereof is now intended, under the influence of said pressure, to pivot downwardly and releases a lever which, amongst else, disengages the clutch driving the grinding mill. Such a construction seems not only to be very complicated and thereby very expensive in view of the plurality of mechanical elements required for a proper operation, but it must also be assumed that the reliability and the precision of the proportioning process will be degraded during its operation time since these mechanical elements are subjected to considerable wear.

OBJECTS OF THE INVENTION

It is an object of the present invention to solve these problems and to offer a better solution, which is much simpler in construction and substantially more reliable in operation. It is a further object of the invention to provide a process and an apparatus for the proportioning of coffee powder in such coffee machines, which allow the use of substantially simpler and cheaper collector motors for the grinding mill. Therefore, the application of the process and the apparatus according to the invention is also most attractive in the field of household coffee machines. It should be reminded that collector motors have a revolution speed which depends of the load; it is therefore not possible to simply substitute an induction motor hitherto used by a collector motor for the purpose hereinbefore explained.

SUMMARY OF THE INVENTION

The present invention provides a process for the proportioning of coffee powder in a coffee machine, which comprises a grinding mill, a proportioning chamber and a processing chamber. The process comprises the following steps:

The grinding mill is fed with coffee beans and operated during a predetermined time, thus producing coffee powder at an outlet aperture thereof. The coffee powder prepared by said grinding mill is then trown out from said outlet aperture of said grinding mill into the adjoining, closed proportioning chamber. Thereby a dynamic pressure is built-up in said closed proportioning chamber by means of said coffee powder thrown thereinto, and said dynamic pressure is transformed into a reversible volume alteration of the proportioning chamber. Finally, said volume alteration is sensed and further used by transforming the sensed value into a control signal for the opening of said proportioning chamber in order to discharge its content into the processing chamber as soon as a predetermined dynamic pressure and thereby a predetermined volume alteration has been reached.

In a preferred embodiment, said volume alteration is recognized by way of the change of the shape of a wall part terminating said proportioning chamber, said change of shape being transformed into an electric signal used to stop the grinding mill and to open the discharge aperture of the proportioning chamber. The invention further provides an apparatus for the proportioning of coffee powder in a coffee machine, making use of the process as hereinbefore described. The coffee machine comprises a grinding mill for the preparation of coffee powder from coffee bean, a proportioning chamber adapted to receive said coffee powder prepared by said grinding mill, and a processing chamber adapted to receive said coffee powder from said proportioning chamber. The proportioning chamber is arranged adjoining an outlet aperture of the grinding mill and it includes a pressuresensitive, elastically resilient wall member arranged at the side which is opposite to said outlet aperture of said grinding mill. Further provided is a signal generator means arranged on and operatively connected to said pressure sensitive wall element of said proportioning chamber to generate an electric signal as soon as a predetermined dynamic pressure and thereby a predetermined volume alteration of said proportioning chamber has been reached.

A wall or bottom portion of said proportioning chamber is arranged to be releasable in response to said signal generated by said signal generator, said wall portion serving as an outlet of said proportioning chamber to said processing chamber, whereby a throw-out impulse produced by the release of said elastically resilient wall member is exerted to the milled product contained in said proportioning chamber upon opening of said wall or bottom portion. Furthermore it has proved to be advantageous if the elastically resilient wall element has the form of an outwardly curved spring plate, which is fixedly connected along one edge thereof to the structure of the apparatus.

Thereby, the proportioning chamber may be built up by means of simple elements and of simple and inexpensive material, whereby a very exact and reliably operating proportioning of the coffee powder may be achieved, which works independently of the load-dependent revolution speed of the grinding mill motor as well as independently of the quality and the size of the product to be milled.

BRIEF DESCRIPTION OF THE DRAWING

In the following, an embodiment of the invention will be further explained with reference to the drawing. The single FIGURE shows a schematic vertical sectional view of the most important parts of a coffee machine, namely the grinding mill, the proportioning chamber and the processing chamber.

DESCRIPTION OF A PREFERRED EMBODIMENT

The embodiment shown in the drawing and described with reference thereto comprises a grinding mill 1, including a lower driven grinding wheel 1a and an upper grinding wheel 1b. The upper grinding wheel 1b is adapted to be manually adjusted with respect to its distance to the lower grinding wheel 1a, whereby the degree of grinding during the milling process may be influenced as desired. The lower grinding wheel 1a is driven by a driving motor 2. Above the upper grinding wheel 1b, there is a feeding hopper 5 receiving the coffee beans to be milled.

At the outlet of the grinding mill, there is provided a socket 3, the coffee powder being thrown therethrough by means of the grinding mill into a proportioning chamber 4. The proportioning chamber 4 consists of two rigid side walls lying parallel to the plane of the drawing as well as of a downwardly opening bottom wall part 7. The wall opposite to the socket 3 as well as the upper wall of the chamber 4 are constituted by a curved spring leaf 8. The spring leaf 8 is connected at its upper part to the structure of the proportioning chamber 4 by means of fastening elements 9, e.g. by means of rivets. The lower edge 10 of the spring leaf 8 is freely displaceable and is guided by a wall portion 11.

At the outer surface of the spring leaf 8, there is provided an actuating lever 12, which is operatively connected e.g. to an electric micro-switch or to another position-responsive signal generating element. The micro-switch 13 provided in the present example is serially connected to the power supply line of the driving motor 2. Furthermore, it serves as a contact generator for a locking mechanism connected to the bottom wall part 7, as will be further described hereinafter.

The apparatus having been switched-on, the grinding mill starts to operate and throws the just prepared coffee powder into the proportioning chamber 4, directly against the spring leaf 8. At this stage of operating, the bottom wall part 7 is in its closed position. As soon as the proportioning chamber 4 is filled with coffee powder, the dynamic pressure exerted by the grinding mill to the spring leaf 8 increases, whereby the latter is more and more curved outwardly than in its initial rest position, thereby operating the actuating lever 12 as well as the micro switch 13. The latter one breaks the power supply line to the motor 2 and interrupts the grinding mill. Simultaneously, a locking mechanism 17, e.g. a catch lever or an electro-magnet, is operated and releases the bottom wall part 7, which is pivotably supported on a pivot axis 18 and being influenced by a spring 19. Thereby the bottom wall part 7 opens downwardly and empties the proportioning chamber 4 via a hopper 15 into a processing chamber 16. The coffee powder will then be brewed in the processing chamber 16 with water or steam. Subsequently an actuating mechanism 14, e.g. a spring lever connected to the bottom wall part 7, is operated by a revolution of a cam disc 6 and thereby the bottom wall part 7 is closed again, so that the catch lever 17 locks-in. Alternatively an operating magnet may be provided at this place.

According to a particular embodiment, the actuating lever 12 on the micro switch 13 is made adjustable, whereby a certain contact point may be preselected, at which a predetermined volume of the proportioning chamber effects the operation of the switch 13. It is this easy manner which allows to choose the amount of powder desired in the proportioning chamber 4. In this case, the spring leaf 8 is curved outwardly to a more or less extent, depending of the adjustment of the actuating lever 12. The dynamic pressure built-up in the proportioning chamber 4 and caused by the grinding mill thereby leads to a volume alteration of the proportioning chamber 4, namely on the basis of an alteration of the shape of a wall part, particularly of the spring leaf 8 of this chamber.

Instead of the micro switch 13, any desired other switching means or sensors may be used, for instance magnetic switches or reed relais.

The apparatus as hereinbefore described allows the use of an extremely inexpensive collector motor, whereby the proportioning means equalize the load dependent variations of the feeding amount delivered by the grinding mill. The decribed process as well as the apparatus allow the manufacture of a surprisingly inexpensive coffee machine of this kind, which, considering the constructive expenditure and thereby the price, is extremely well suited as a household coffee machine. It allows a very precise proportioning of the desired amount of coffee and incldues at least all advantages of a time-controlled coffee machine of this kind, which offers the possibility to prepare coffee made of really freshly milled coffee powder in the desired strength at any time.

What is claimed is:

1. A process for proportioning of coffee powder in a coffee machine comprising a grinding mill driven by an electric motor, a closed proportioning chamber having a resilient wall portion, and a processing chamber, the process comprising the steps of:

feeding coffee beans into said grinding mill and operating said grinding mill to produce coffee powder, discharging the coffee powder from said grinding mill into the closed proportioning chamber, sensing coffee powder volume alteration in the proportioning chamber, and generating an electrical signal upon filling the proportioning chamber to a predetermined volume for stopping operation of said electric motor and thereby said grinding mill and for simultaneous opening of the proportioning chamber to discharge its content into the processing chamber;

the step of sensing the coffee powder volume alteration in the proportioning chamber comprising the step of sensing a change in the shape of the resilient wall portion.

2. An apparatus for proportioning coffee powder in a coffee machine, the apparatus comprising:

a grinding mill for preparation of coffee powder from coffee beans;

an electric motor for operating said grinding mill;

a proportioning chamber into which the coffee powder produced by said grinding mill is discharged, said proportioning chamber comprising a first wall portion which is movable to open said proportioning chamber to allow coffee powder to drop therefrom and said proportioning chamber being further defined at least in part by a second variable shape resilient wall portion which changes in shape in response to coffee powder volume alteration in said proportioning chamber;

means for opening said first wall portion; and electrical signal generator means for generating an electrical signal in response to sensing a predetermined volume of the coffee powder in said porportioning chamber by said second variable shape resilient wall portion for effecting simultaneously deactuation of said electric motor and actuation of said means for opening said first wall portion.

3. An apparatus according to claim 2, wherein said second variable shape resilient wall portion has the form of an outwardly curved spring plate which is fixedly connected along one edge thereof to said apparatus structure.

* * * * *